Oct. 28, 1958 L. E. RUSSELL 2,857,876
AIR HORN AND TANK ASSEMBLY
Filed Jan. 24, 1955 2 Sheets-Sheet 2

INVENTOR
LINUS E. RUSSELL
BY Tom Walker

United States Patent Office 2,857,876
Patented Oct. 28, 1958

2,857,876

AIR HORN AND TANK ASSEMBLY

Linus E. Russell, Springfield, Ohio, assignor to Peters & Russell, Inc., Springfield, Ohio, a corporation of Ohio Application January 24, 1955, Serial No. 483,728

5 Claims. (Cl. 116—139)

This invention relates to sound signaling systems, and more particularly to portable, manually powered and operated systems of the kind described having especial utility on relatively small water craft lacking power signaling equipment.

The object of the invention is to simplify the construction as well as the means and mode of operation of portable sound signaling systems, whereby such systems may not only be economically manufactured, but will be more efficient and satisfactory in use, adaptable to a wide variety of applications, having relatively few parts and be unlikely to get out of repair.

A further object of the invention is to present a sound signaling system comprising a sound emitting component and a power generating component constructed and arranged to be coupled togteher for unitary storage and transportation, yet separable so that the sound emitting component may be independently held and carried about when in use.

Another object of the invention is to present a relatively light weight, compact signaling system lending itself to simplified storage, handling and use.

A further object of the invention is to present a compressed air operated signaling system comprising a pump component and a horn component, novel in their combination and in respective individual features.

Still another object of the invention is to present a generally new horn component wherein the horn element is contained within a pressure receiver tank, with manipulative means being provided outside the tank for controlling actuation of the horn by the air in the tank.

A further object of the invention is to provide a sound signaling system possessing the advantageous structural features, the inherent meritorious characteristics and the mode of operation herein described.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings or their equivalents.

Referring to the accompanying drawings, wherein is found one but obviously not necessarily the only form of embodiment of the invention, Fig. 1 is a view in longitudinal section of a sound signaling system in accordance with the illustrative embodiment of the invention;

Like parts are indicated by similar characters of reference throughout the several views.

Figure 1:
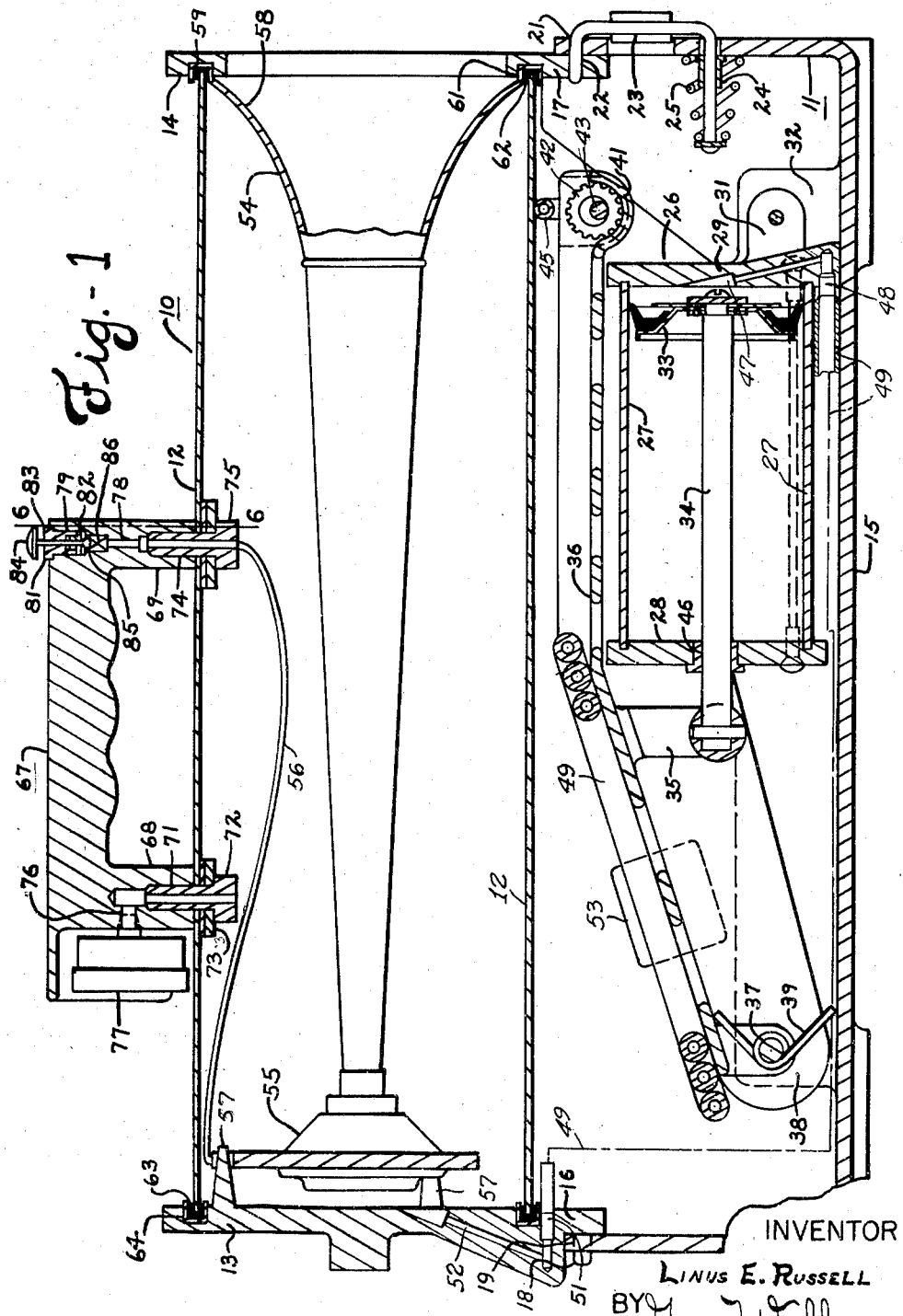
Figure 2:
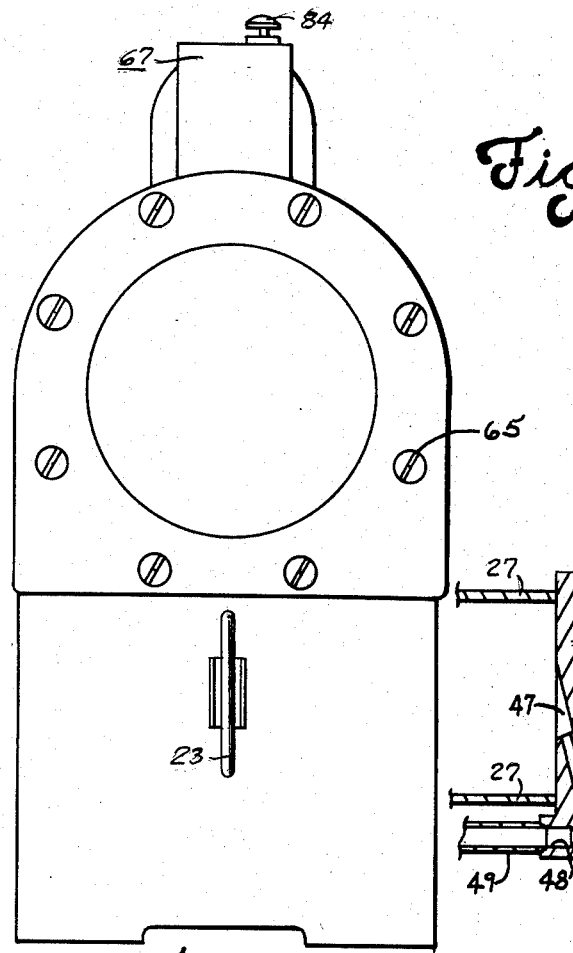
Fig. 2 is a view in end elevation of the system of Fig. 1.

Referring to the drawings, a sound signaling system in accordance with the illustrated embodiment of the invention comprises a sound emitting unit 10 and a power generating unit 11 which when not in use are coupled into an integrated assembly for unitary storage and transportation. In use, the unit 10 is removed from the unit 11 and separately held and manipulated for a directed sound emission, the unit 11 remaining relatively stationary and operated manually to power the sound emitting unit.

The unit 10 includes a cylindrical tank shell 12 and end closure plates 13 and 14. The power generating unit 11 includes a substantially rectangular box-like housing 15 open at the top thereof. The closure plates 13 and 14 have respective dependent flange portions 16 and 17 received in adjacent parallel relation to end walls of the housing 15. An integral stud 18 on the flange portion 16 is received in an opening 19 in the one end wall. The other end wall and the flange portion 17 have openings 21 and 22 adapted to be aligned to receive one end of a substantially U-shaped pin 23. The other end of the pin 23 passes through a bushing 24 installed in the described end wall of housing 15 and is relatively elongated for action thereupon by a compression spring 25 tending to maintain the pin 23 in an operative interlocking position relatively to the respective units 10 and 11. It will be understood however, that by pulling outwardly on the pin 23 the first described end thereof may be brought out of opening 22 in the closure plate 14 whereby to release the unit 10 from the unit 11 and making it possible to lift the tank shell 12 and associated parts from its position of support on the housing 15 of the power generating unit.

In the assembled or non- operating position of the parts as illustrated in Fig. 1, the unit 10 is in overlying superposed relation to the unit 11 and effectively closes the open top of the housing 15. The unit 10 thus conceals at this time and prevents operation of a pump assembly 26 contained within the housing 15. The pump 26 includes a cylinder 27 and end closure plates 28 and 29, the latter being pivotally connected, as by an ear 31 thereon, to an upstanding boss 32 on the bottom of housing 15. A piston 33 is reciprocable in the cylinder 27 and is connected by a rod 34 to an arm 35 dependent from a foot treadle 36. The treadle 36 is pivotally mounted on a shaft 37 supported between upstanding bosses 38 on the bottom of the housing 15. A spring 39 bears on the housing 15 and on the treadle 36 in a manner to urge the treadle upward or in a counter-clockwise direction as viewed in Fig. 1, the treadle being held downward at the time illustrated by the overlying sound emitting unit 10.

The treadle 36 extends in substantially parallel adjacent relation to the cylinder 27 and at the end opposite the end on shaft 37 is formed with a transverse trough 41. Received in the trough 41 is a strap of resilient deformable material, for example a length of rubber hose. The ends of the strap 42 substantially abut upstanding side walls of the treadle 36. Installed in these side walls and passing longitudinally through the strap 42 is a pin 43 which is of small diameter relatively to the internal diameter of the strap 42 and which serves to retain the strap in the trough 41 without, however, materially interfering with deformation of the strap from an overlying pressure. On the exterior of the upstanding side walls of the treadle 36, and in line with the strap 42, are retaining plates 44. Another length of hose 45 has its ends fastened or pinched between the plates 44 and the treadle 36 and extends as a yoke in spaced overlying relation to the strap 42. The described assembly constitutes a stirrup means in which the toe portion of an operator's foot may frictionally be received and confined.

Figure 4:
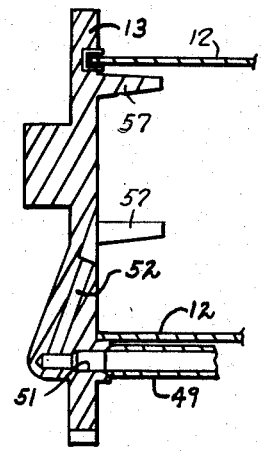
Fig. 4 is a detail view in cross section of one end of the pressure receiving tank.
Figure 5:
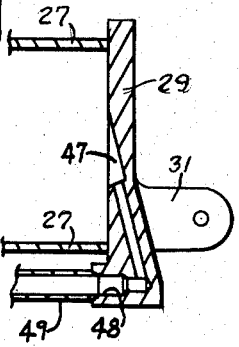
Fig. 5 is a detail view in cross section of one end of the cylinder in the power generating unit.
Figure 3:
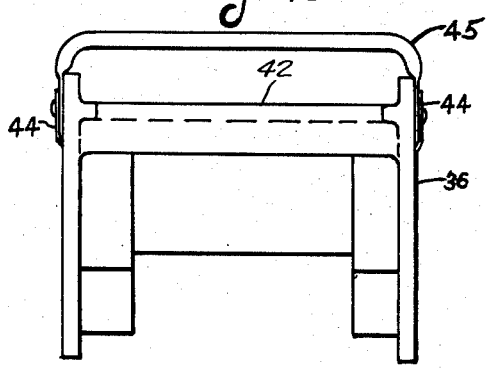
Fig. 3 is a detail view in end elevation of a pump treadle comprised in the power generating unit of the system.

With respect to the pump assembly, therefore, it will be understood that the operator rests his foot on the treadle 36 and in conjunction with the spring 39 effects a reciprocating movement of the piston 33 in the cylinder 27, the cylinder structure having a compensating tilting movement about the housing boss 32 in conjunction with the oscillatory movements of the treadle 36. Air for compression in the cylinder is drawn into the cylinder by way of an opening 46 in the closure plate 28. On the retracting or leftward stroke of the piston (as seen in Fig. 1) the air previously drawn in through opening 46 passes about the periphery of the piston into the space between the front of the piston and closure plate 29. Now, as the piston 33 travels in a reverse or rightward direction the air in this space is compressed, and, as motion of the piston continues, is forced out of the cylinder by way of passage 47 (Fig. 5) terminating in a bore 48. Installed in the bore 48 is one end of a flexible hose line 49, the other end of which communicates with and is installed in a bore 51 (Fig. 4) in the plate 13 of the sound emitting unit 10. The bore 51 in turn communicates with a passage 52 in plate 13 opening into the interior of tank shell 12.

The hose 49 is disconnected when the system is not in use and may be stored as indicated in Fig. 1 where it is shown coiled and held on the treadle 36 by a clip 53.

Longitudinally disposed in the tank shell 10, and spaced from the side walls thereof, is a horn element 54 having a base portion 55 receiving compressed air through a line connection 56 for the energizing or actuating of the horn. The base end of the horn 54 is received in and supported by a circumferential series of conical projections 57 on the end closure plate 13. At the opposite end of the horn element 54 is a bell end 58, the belled portion flaring outwardly and terminating in a reversely bent channel portion 59. The channel portion 59 interfits in an annular groove 61 in the end plate 14 and mounts a seal member 62 which in turn receives the adjacent end of the tank shell 12. The opposite end of the shell 12 is received in a similar seal 63 set in an annular groove 64 in the end closure plate 13. The plates 13 and 14 are interconnected by external tie rods 65 and it will be understood that the described construction and arrangement of parts is such as to effectively seal the interior of the tank shell 12 against the escape of compressed air therefrom, and in particular around the bell end of the horn element 54 which end in effect opens to atmosphere through the plate 14 since such plate has a large central opening 66 aligned wtih the horn element 54.

Figure 6:
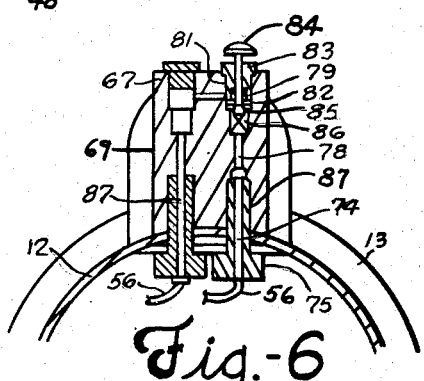
Fig. 6 is a view in cross section taken substantially along the line 6—6 of Fig. 1.

A handle 67 is mounted on the tank shell 12 whereby carrying of the sound emitting unit alone or of the sound signaling system as a unit is facilitated. The handle 67 has leg portions 68 and 69 resting on the exterior of the shell 12. A bore 71 in the leg 68 registers with an opening in the tank shell and receives the threaded shank of a bushing 72 inserted in the bore 71 from inside the tank shell. The shank of the bushing 72 is screw threaded into the bore 71 and the bushing further has an enlarged head in the shell limiting against the internal wall of the shell through a lock nut 73. The other leg 69 of the handle 67 has a bore 74 similarly receiving a like bushing 75. The bushings 72 and 75 effectively lock the handle 67 to the shell 12. Further, the bushing 72 and the bushing 75 are open throughout their lengths and communicate the interior of the shell 12 with the respective bores 71 and 74 in the handle. Bore 71 communicates with a laterally extending bore 76 in which is installed a pressure gauge 77 whereby the existing air pressure within the tank shell may be represented exteriorly of the tank. The bore 74 is connected by a small diameter passage 78 with another bore 79 opening through the upper surface of the handle 67. A counterbore 81 provides a seat for a ring-shaped seal 82. A bushing 83 is screwed into the counterbore 81 and sldingly mounts a plunger 84, the lower end of which extends through the ring-shaped seal 82 and has an enlarged portion 85 urged by a spring 86 to engage the underside of the ring-shaped seal 82 and close the center opening therein. When so closed, pressure fluid from bore 74 is denied access to the counterbore 81. Should, however, the plunger 84 be depressed the enlarged portion 85 will move downward against the urging of spring 86 and open flow through the ring-shaped seal 82 into the counterbore 81. The plunger 84, it may be noted, is conveniently placed on the handle 67 for operation by the thumb or finger of the same hand holding the tank unit. As indicated in Fig. 6, a bore 87 in the leg 69 of the handle 67 also communicates at its upper end with the counterbore 81 and at its lower end receives the opposite end of the above mentioned hose line connection 56. As a result, therefore, depression of the plunger 84 to open flow from the interior of the tank 12 to the counterbore 81 serves to admit such air by way of bore 87 and line 56 to the base end of the horn element 54, energizing such horn for sound in the usual manner.

It is felt that the mode of operation of the system has adequately been set forth. The hose connection 49 may be of any convenient length, for example about six feet. The sound emitting unit is detachable from the foot pump unit and the signaler may thus hold or place the sound emitting unit in a convenient manner, while pumping the treadle 36 up and down, and transmit warnings or code signals by means of the plunger-valve means on the handle of the sound emitting unit. Variations in pump capacity and volume of the tank shell 12 are of course possible. The relationship of the illustrated combination has been determined by a requirement for raising the tank pressure relatively quickly to a pressure value on the order of 75 to 80 pounds which will then serve to produce interval blasts for slightly over two and one-half minutes.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A portable sound signaling system, including an air pump housing open at the top thereof, a manually operated air pump in said housing having control means for the operation thereof accessible through the open top thereof, an air receiver tank supported by said housing in overlying closing relation to the top thereof, said tank being separable from said housing for independent handling and to expose said pump and control means, an air actuated horn supported in and movable with said tank, a flexible hose line for conducting air from said pump to said tank and means on said tank incorporating control means for selectively communicating the air from said tank to said horn.

2. In a device of the class described, a relatively stationary pump housing for connection with a housing containing a horn, a cylinder supported in said housing, means for connecting fluid in said cylinder with the horn housing, a piston reciprocable in said cylinder to transfer fluid therefrom to the horn housing, a foot actuated treadle pivotally connected to said housing and to said piston for operation of said piston, stirrup means on said treadle receiving the toe portion of the foot of the operator in frictional confining relation, said stirrup means comprising a relatively soft and deformable strap transversely overlying said treadle and an elastic yoke in spaced overlying relation to said strap.

3. A portable sound signaling system, including an air receiving tank, an air actuated horn longitudinally disposed in said tank with the bell end thereof opening through one end of said tank, a handle attached to the exterior of said tank, an air pasageway from the interior of said tank to said horn through said handle, a hand operable valve on said handle controlling air flow through said passageway, and an air inlet passage in said tank to the interior thereof.

4. A portable sound signaling system, including an air receiving tank, and air actuated horn longitudinally disposed in said tank with the bell end thereof opening through one end of said tank, a passageway from the interior of said tank to said horn, a hand operable valve on said tank controlling air flow through said passageway, an air pressure generating unit, a flexible hose line interconnecting said unit and said tank for supplying air under pressure to said tank, means for detachably coupling said tank and said pressure generating unit together for unitary handling, and a handle attached to one of said tank and said unit for said unitary handling.

5. A portable sound signaling system, according to claim 4, characterized in that said handle is on said tank, said valve being arranged on said tank for convenient manipulation by the same hand grasping said handle.

References Cited in the file of this patent
UNITED STATES PATENTS

| | | |
|---|---|---|
| 435,363 | Millbourn | Aug. 26, 1890 |
| 436,651 | Dyer | Sept. 16, 1890 |
| 1,427,034 | Svensson | Aug. 22, 1922 |
| 1,440,393 | Kennedy | Jan. 2, 1923 |

FOREIGN PATENTS

| | | |
|---|---|---|
| 25,595 | Great Britain | July 29, 1899 |